US012692084B2

(12) United States Patent　　　　　(10) Patent No.:　US 12,692,084 B2

Seiss et al.　　　　　　　　　　　　　(45) Date of Patent:　　Jul. 28, 2026

(54) METHOD AND DEVICE FOR STABILIZING CARRIER BASKET TRAVELING ON A CONVEYOR SYSTEM TO MAINTAIN BASKET ALIGNMENT AT LOADING/UNLOADING STATIONS

(71) Applicant: Franke Technology and Trademark Ltd, Hergiswil (CH)

(72) Inventors: Richard Seiss, Mount Juliet, TN (US); Alex Hagenbuch, Spring Hill, TN (US); Jacob Pawelski, Nashville, TN (US)

(73) Assignee: Franke Technology and Trademark Ltd, Hergiswil (CH)

( * ) Notice: Subject to any disclaimer, the term of this patent is extended or adjusted under 35 U.S.C. 154(b) by 57 days.

(21) Appl. No.: 18/730,164

(22) PCT Filed: Jan. 26, 2023

(86) PCT No.: PCT/EP2023/051844

§ 371 (c)(1),
(2) Date: Jul. 18, 2024

(87) PCT Pub. No.: WO2023/151954

PCT Pub. Date: Aug. 17, 2023

(65) Prior Publication Data

US 2025/0100807 A1　　　Mar. 27, 2025

Related U.S. Application Data

(60) Provisional application No. 63/307,718, filed on Feb. 8, 2022.

(51) Int. Cl.
　　*B65G 17/48*　　　(2006.01)
　　*B65G 17/12*　　　(2006.01)
　　*B65G 21/20*　　　(2006.01)

(52) U.S. Cl.
　　CPC .......... *B65G 17/485* (2013.01); *B65G 17/123* (2013.01); *B65G 21/2072* (2013.01)

(58) Field of Classification Search
　　CPC .... B65G 17/485; B65G 17/12; B65G 17/123; B65G 17/126; B65G 17/14; B65G 21/2072
　　See application file for complete search history.

(56) References Cited

U.S. PATENT DOCUMENTS

| | | | | |
|---|---|---|---|---|
| 2,657,696 | A | * | 11/1953 | Von Maur .......... B65G 49/0418 |
| | | | | 134/166 R |
| 4,069,093 | A | * | 1/1978 | Linner .................. B65B 51/067 |
| | | | | 156/522 |

(Continued)

FOREIGN PATENT DOCUMENTS

| | | | |
|---|---|---|---|
| JP | H1025024 A | 1/1998 | |
| WO | WO-2025062197 A1 | * 3/2025 | ........... B65G 19/025 |

OTHER PUBLICATIONS

Translation of WO 2025/062197 (Year: 2025).*

*Primary Examiner* — Mark A Deuble

(74) *Attorney, Agent, or Firm* — Volpe Koenig

(57)　　　　ABSTRACT

A carrier basket stabilizing system and method for use with a conveyor system having a pathway on which cars are guided, with at least some of the cars having a carrier basket pivotally mounted thereon. The conveyor system includes a curved portion of the pathway, that may be directly before at least one of a loading station or an unloading station. The system includes a support configured to be located adjacent to a portion of the pathway, with a deflectable element on the support that extends generally parallel to the portion of the pathway, with the deflectable element extending partially into a space envelope generated by the carrier basket as it moves through the portion of the pathway. The deflectable (Continued)

element includes bristles that suppress an outward swinging movement of the carrier basket.

12 Claims, 12 Drawing Sheets

(56)                    References Cited

U.S. PATENT DOCUMENTS

| | | | | |
|---|---|---|---|---|
| 4,957,188 | A | 9/1990 | Bavis | |
| 7,708,135 | B2 * | 5/2010 | Ellerth | A47F 10/06 |
| | | | | 198/801 |
| 11,866,254 | B2 * | 1/2024 | Reischl | B65G 17/32 |
| 12,172,842 | B2 * | 12/2024 | Hagenbuch | B65G 47/57 |
| 2021/0094761 | A1 | 4/2021 | Czapp et al. | |
| 2021/0403234 | A1 | 12/2021 | Altwegg | |
| 2024/0083684 | A1 * | 3/2024 | Czapp | B65G 17/16 |

* cited by examiner

METHOD AND DEVICE FOR STABILIZING CARRIER BASKET TRAVELING ON A CONVEYOR SYSTEM TO MAINTAIN BASKET ALIGNMENT AT LOADING/UNLOADING STATIONS

TECHNICAL FIELD

The present invention relates to the field of conveyor systems for use in moving products, such as delivery of orders in chain restaurants, bars, cafeterias, or the like. More particularly, the invention relates to a system for ensuring proper alignment of the carriers moved by the conveyor as they move into the loading and/or unloading stations.

BACKGROUND

Applicant has developed and markets an overhead conveyor system which is based on a continuous track made up into a closed loop that contains an endless "train" of small wheeled cars connected together. The track is normally suspended from the ceiling or wall and can be made to snake through a building from a loading point to an unloading point and back again. Food products to be transported need to be in packages or bags, which are placed in carrier baskets carried by some of the wheeled cars. Various means may be provided to unload or release the packages or bags from the carrier basket and the food placed into a holding tray.

Another food transport system for the vertical transport of packaged food items from one floor of a restaurant to another floor is described in U.S. Pat. No. 7,708,135. The food transport system includes a conveyor that transports food-item supporting carriers along a closed-loop pathway defined by a belt or chain, to which the carriers are pivotally connected. Although the transport of food items placed on supporting carriers is convenient, the belt or chain-based conveyor system is much less flexible in terms of space utilization and winding transport pathways.

US 2021/0094761 of the Applicant is also directed to a conveyor system for the transport of packaged food items in restaurants, etc., which allows a flexible design of layouts. This provides a track-based conveyor system with supporting carriers on which food items to be transported can be placed at a loading station. The food items are then transported to a customer delivery point which is remote from the loading station. Here, the packaged items are loaded onto the carriers at loading and unloading stations. In one preferred arrangement, the carriers are defined by basket having a series of support fingers, and these carrier support fingers are aligned with spaces located between loading/unloading station support fingers or rollers. The entire content of US 2021/0094761 is incorporated herein by reference as if fully set forth.

SUMMARY

The present disclosure is directed to a method and device for stabilizing carrier baskets traveling on a conveyor system to maintain basket alignment, preferably at loading and/or unloading stations, but also in other areas of the conveyor system. Here it has been found that at higher transport speeds, the carrier baskets may swing as they move around a return corner, for example, as they approach the loading and/or unloading station. This swinging due to centrifugal forces acting on the pivotally supported carrier baskets is undesirable, and can, for example, result in the comb structure of the carrier basket formed by the carrier support fingers interfering with the loading/unloading station support fingers or rollers. It can also cause other unwanted contact in areas with limited clearance along the conveyor system pathway or result in undesirable tipping or movement of the product inside the carrier baskets.

In order to address this, a carrier basket stabilizing system is provided at least in a curved area of the conveyor system.

In one aspect, the carrier basket stabilizing system is configured for use with a conveyor system having a pathway on which cars are guided, with at least some of the cars having a carrier basket pivotally mounted thereon. The conveyor system includes a curved portion of the pathway, that may be, for example, directly before at least one of a loading station or an unloading station. The carrier basket stabilizing system includes a support configured to be located adjacent to the pathway. A deflectable element is located on the support and extends generally parallel to the pathway, with the deflectable element extending partially into a space envelope generated by the carrier basket as it moves along the pathway. The deflectable element comprises bristles that are configured to suppress at least one of an inward or an outward swinging movement of the carrier basket.

In one embodiment, the at least one deflectable element comprises first and second ones of the deflectable elements and the first and second deflectable elements are located on opposite sides of the pathway. Preferably, the first and second deflectable elements are arranged with respective upstream ends, that are arranged on the carrier entry side, spaced farther apart from the pathway than the downstream ends, arranged at the carrier basket exit ends thereof.

In one embodiment, the at least one deflectable element comprises a single deflectable element located along the curved section of the pathway, and the deflectable element extends partially into the space envelope generated by the carrier basket as it moves along the pathway.

In one embodiment, bristles are arranged in one or more bristle segments that are attached to the support, each of the bristle segments having the bristles held such that free ends of the bristles are arranged linearly. A plurality of bristle segments can be arranged angled relative to one another so that the linearly arranged free ends extend generally parallel to the curved portion. The number of bristle segments can be varied, but is preferably at least 2.

In another embodiment, a single bristle segment is provided.

In one particular arrangement, the bristles include bristle ends that are aligned along a curved path that is parallel to the curved portion of the pathway. This can be formed as a single continuous bristle segment or multiple bristle segments Preferably, the support includes a curved surface that is generally parallel to and offset from the curved path of the bristle ends that acts as a non-deflectable limit stop against further outward swinging movement of the carrier basket.

In one arrangement, the bristles include an angled entry area of the bristle ends on an upstream side so that gradual contact is made with the carrier basket.

In one preferred application, the curved portion of the pathway is located directly upstream of the at least one of the loading station or unloading station, and the bristles are configured to suppress at least one of an inward or an outward swinging movement of the carrier basket in order to maintain an alignment of the carrier basket as the carrier basket enters the loading station or the unloading station. This prevents the comb structure of the carrier basket formed by the carrier support fingers from interfering with the loading/unloading station support fingers or rollers.

The invention also provides a conveyor system that includes the carrier basket stabilizing system having one or more of the features described herein.

In another aspect, a method of stabilizing carrier baskets being moved on a conveyor system is provided where the conveyor system has a pathway on which cars are guided, with at least some of the cars having the carrier baskets pivotally mounted thereon, and the conveyor system including at least one of a loading station or an unloading station with a curved portion of the pathway located directly upstream of the at least one of the loading station or unloading station. The method includes the steps of (a) providing a support adjacent to the pathway; (b) providing a deflectable element on the support that extends generally parallel to the pathway, with the deflectable element extending partially into a space envelope generated by the carrier basket as it moves along the pathway, the deflectable element comprising bristles; and (c) the bristles suppressing at least one of an inward or an outward swinging movement of the carrier basket as the carrier basket moves through the bristles.

Various aspects of the invention described herein can be used separately or together, depending on the particular application.

BRIEF DESCRIPTION OF THE DRAWINGS

Further advantages and characteristics of the invention will become apparent by the below description of embodiments making reference to the accompanying drawings, in which.

DETAILED DESCRIPTION

Figure 1:
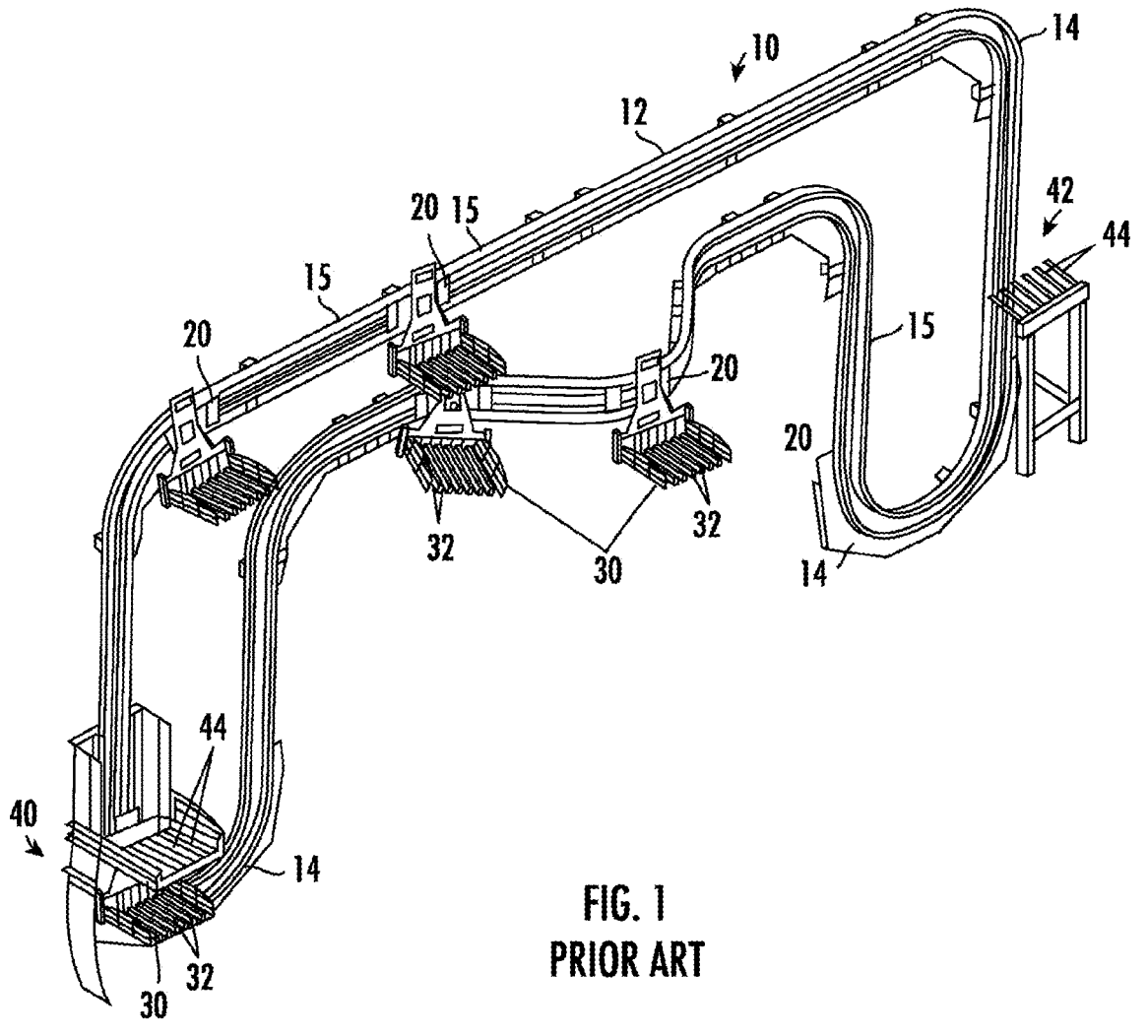
FIG. 1 is a perspective view showing a conveyor system in accordance with Applicant's prior art with which the present invention is utilized.

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof. The terms approximately or generally mean within +/−10% of a specified value unless otherwise noted, and within +/−25° of a specified angle or direction, which also applies to linear segments approximating a curve.

Figure 8:
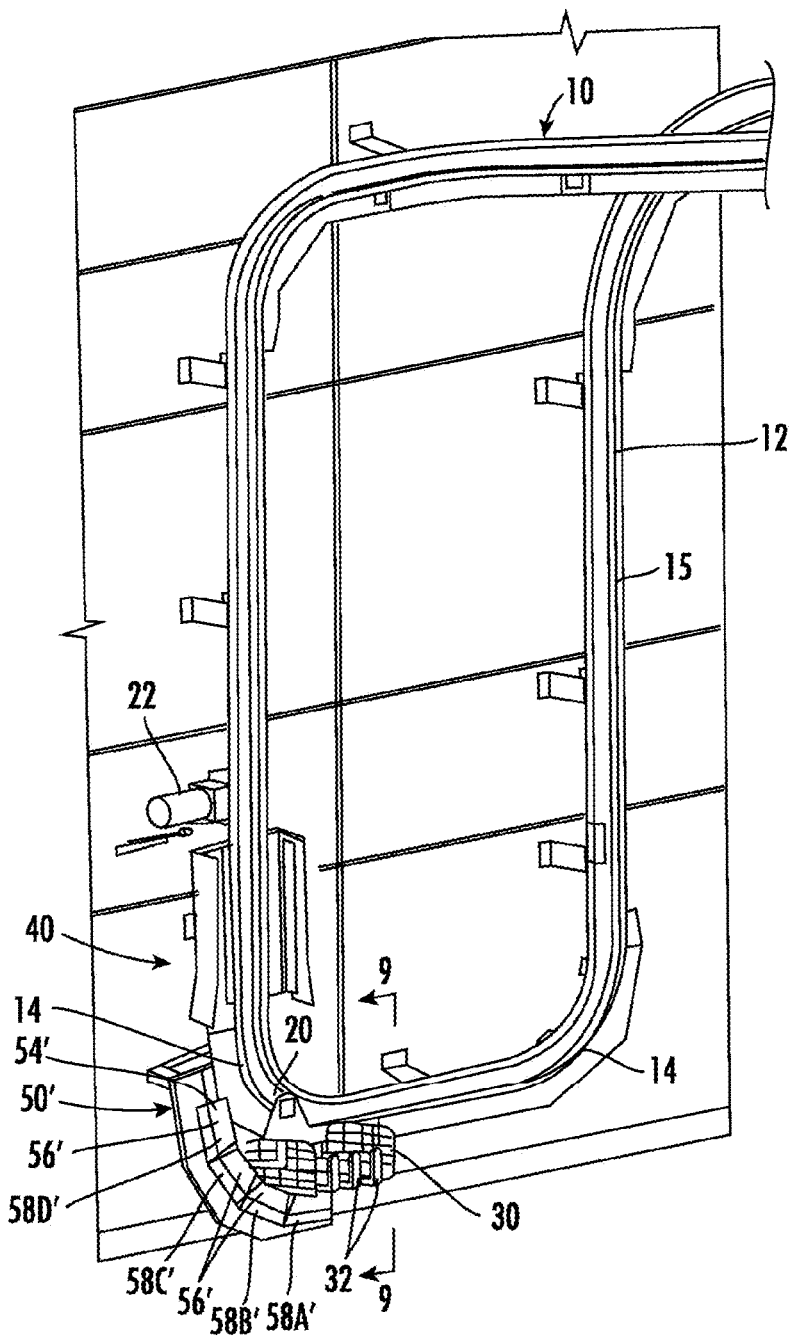
FIG. 8 is a perspective view showing a portion of the conveyor system with which the carrier basket stabilizing system of FIGS. 4-7 is utilized.

FIG. 1 is a view showing an embodiment of Applicant's conveyor system 10 from U.S. 2021/0094761, which is incorporated herein by reference as if fully set forth. This includes a pathway 12 defined by a track 13 having one or more curved portions 14 as well as straight segments 15 in which a plurality of cars 20 are guided. A motor (22 in FIG. 8) drives the cars 20 along the track 13 either via having the cars 20 directly linked to one another or having intermediate portions located between the cars 20. A carrier basket 30 is pivotally mounted to at least some of the cars, with the carrier basket 30 including carrier support fingers 32 that are cantilevered from the side of the carrier basket 30 that is pivotally connected to the cars 20. At least one of a loading station 40 or an unloading station 42 is located along the pathway 12, and as shown in FIG. 1, a curved portion 14 of the pathway 12 is located directly upstream of the at least one of the loading station 40 or unloading station 42. The loading and unloading stations 40, 42 include support fingers 44 that are used to remove an item being transported from the carrier basket 30 by the carrier basket support fingers 32 moving between the loading or unloading station support fingers 44 to either pick-up or drop-off the item being transported via the conveyor system 10. As discussed in U.S. 2021/0094761, the conveyor system 10 allows enhanced flexibility for the design of layouts in order to suit particular applications and space requirements.

As discussed above, the carrier baskets 30 may swing as they move around these curved portions 14 of the pathway 12 due to centrifugal force. This swinging of the carrier baskets 30 is undesirable and can result, for example, in the carrier support fingers 32 of the carrier basket 30 interfering with the loading/unloading station support fingers 44 that are used to remove an item being transported from the carrier basket 30 by the carrier basket support fingers 32 moving between the loading or unloading station support fingers 44 to either pick-up or drop-off the item being transported via the conveyor system 10. It can also result in tipping over or movement of the packages being carried.

Figures 2, 3:
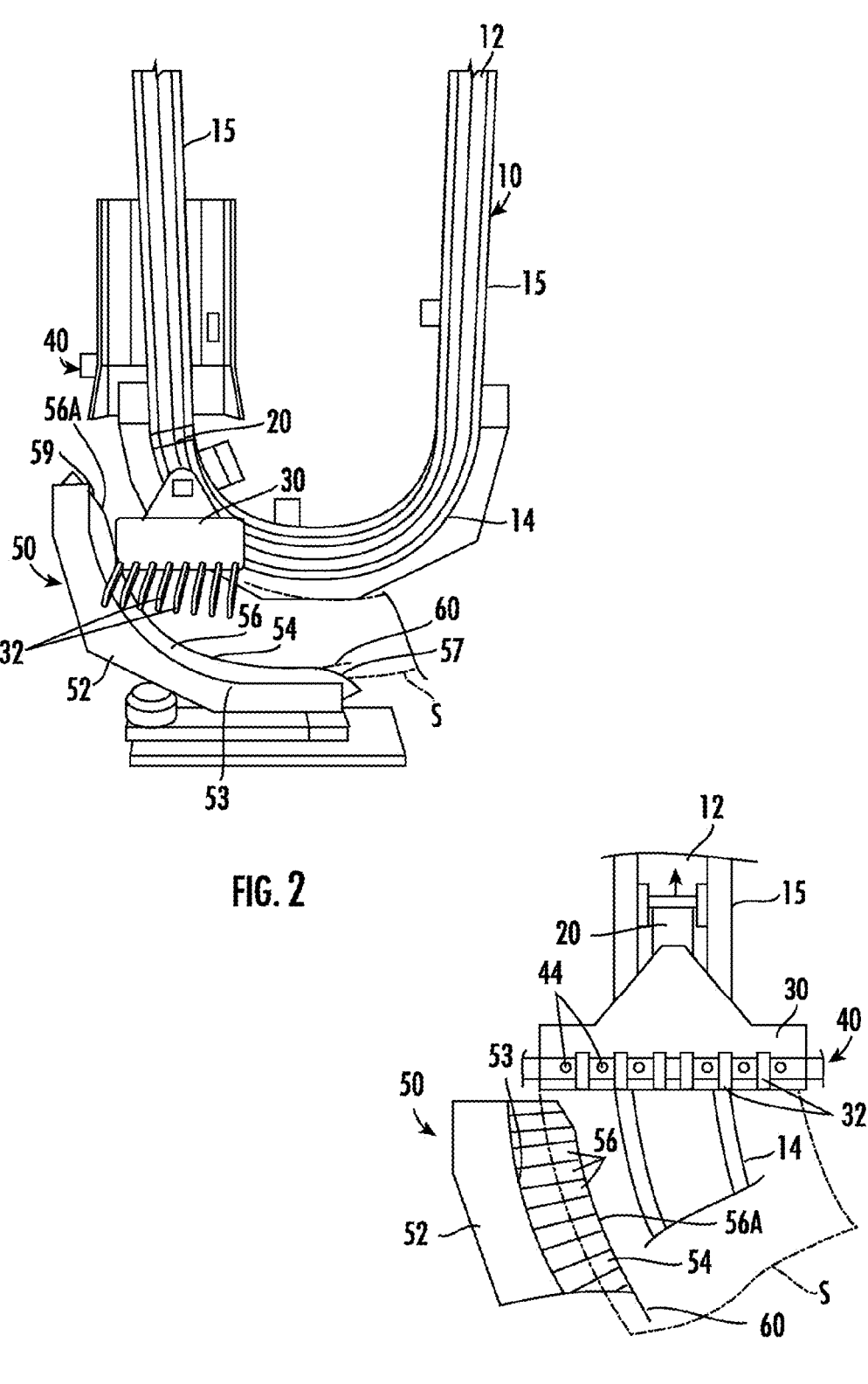
FIG. 2 is an elevational view showing the carrier basket stabilizing system disclosed herein being used in connection with the conveyor system.
FIG. 3 is a partial elevational view showing the carrier basket stabilizing system with a carrier basket having just exited the stabilizing system prior to proceeding through a loading station.
Figure 4:
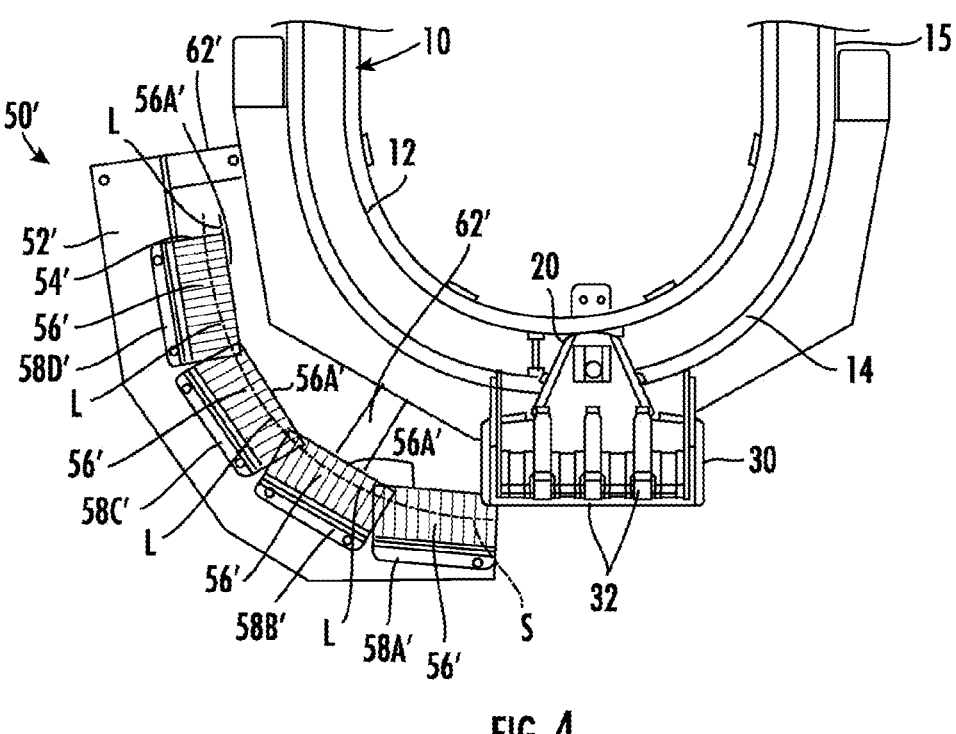
FIG. 4 is an elevational view of a second embodiment of a carrier basket stabilizing system shown with the carrier basket entering the upstream side of the deflectable element.
Figure 5:
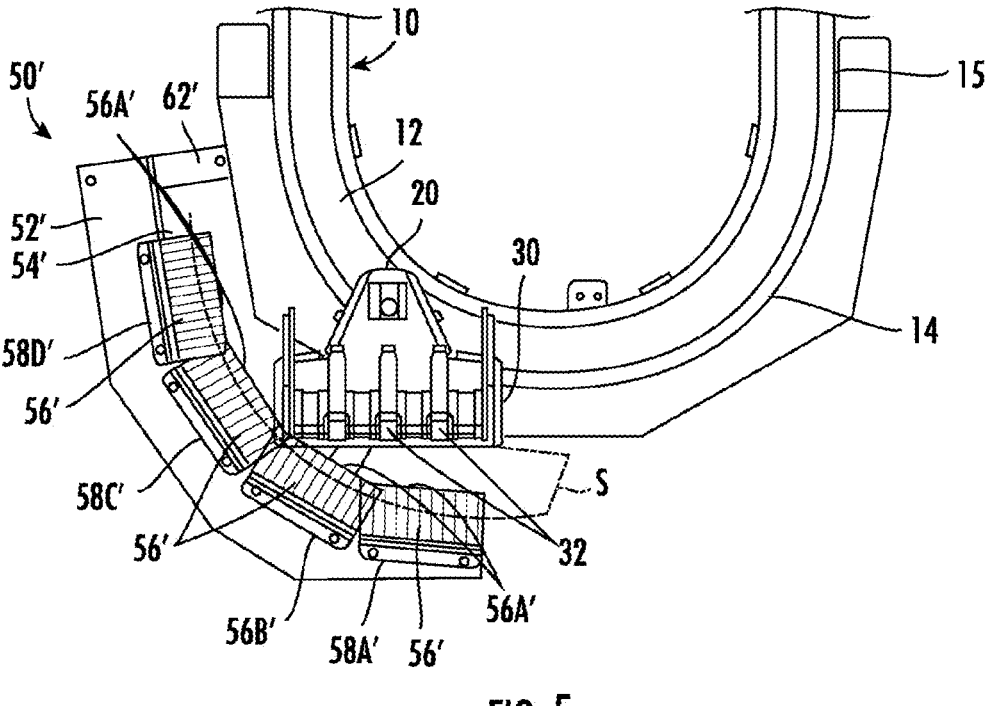
FIG. 5 is an elevational view similar to FIG. 4 showing the carrier basket in a middle portion of the carrier basket stabilizing system.
Figure 6:
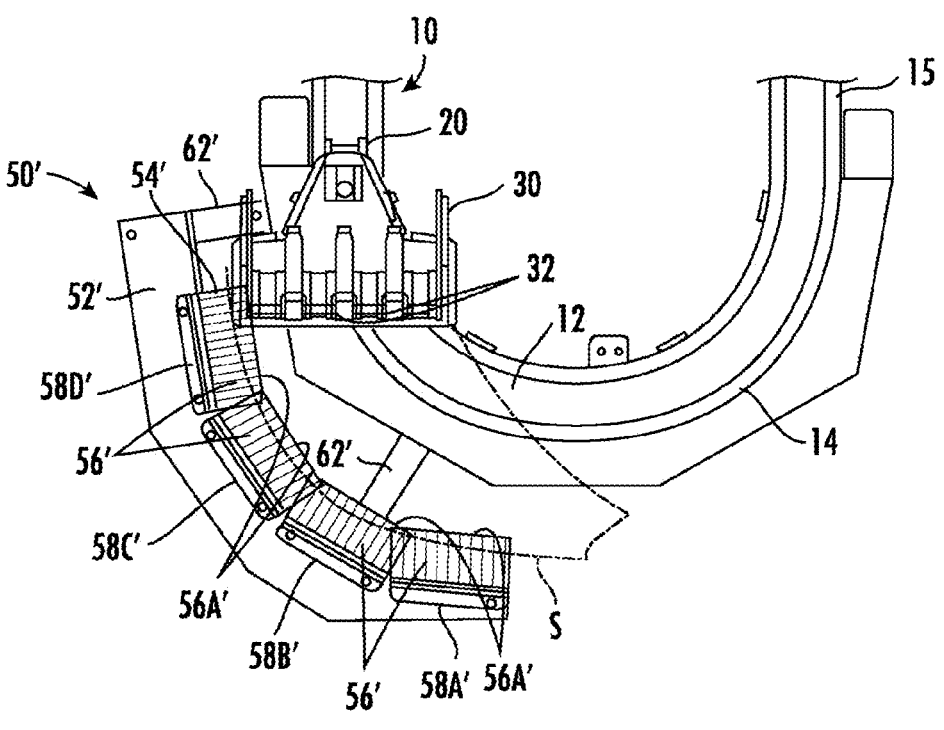
FIG. 6 is a view similar to FIGS. 4 and 5 showing the carrier basket as it exits the carrier basket stabilizing system.

Referring now to FIGS. 2 and 3, a first embodiment of the carrier basket stabilizing system 50 is shown. The carrier basket stabilizing system 50 includes a support 52 that is configured to be located adjacent to the pathway 12, and more preferably the curved portion 14 of the pathway 12. This can be at one or multiple locations along the pathway 12. A deflectable element 54 is located on the support 52 and extends generally parallel to the pathway 12, and in this embodiment, the curved portion 14 of the pathway 12. The deflectable element 54 extends partially into a space envelope S generated by at least the bottom edges of the carrier basket 30 as it moves along the pathway 12, and in this first embodiment, along the curved portion 14. The deflectable element 54 comprises bristles 56 that are configured to suppress an outward swinging movement of the carrier basket 30. The bristles 56 may be in the form of nylon brush bristles or the like, or also could be formed of other resiliently deflectable materials and the term "bristle" is intended to encompass any plurality of generally linearly extending resilient elements mounted parallel to one another that are resiliently deflectable in order to absorb and suppress an outward swinging movement of the carrier basket 30 due to centrifugal force as it travels along the pathway 12.

As shown in FIGS. 2 and 3, the bristles 56 include bristle ends 56A that are aligned along a curved path 60 that is parallel to the curved portion 14 of the pathway 12. Preferably, the support 52 includes a curved surface 53 that is also parallel to and offset from the curved path 60 of the bristle ends 56A that acts as a non-deflectable limit stop against further outward swinging movement of the carrier basket 30.

Also as shown in FIG. 2, the bristles ends 56A preferably include an angled entry area 57 on an upstream side where the carrier basket 30 enters the carrier basket support stabilizing system 50. A further angled exit 59 can also be provided, as shown in FIGS. 2 and 3.

Figure 7:
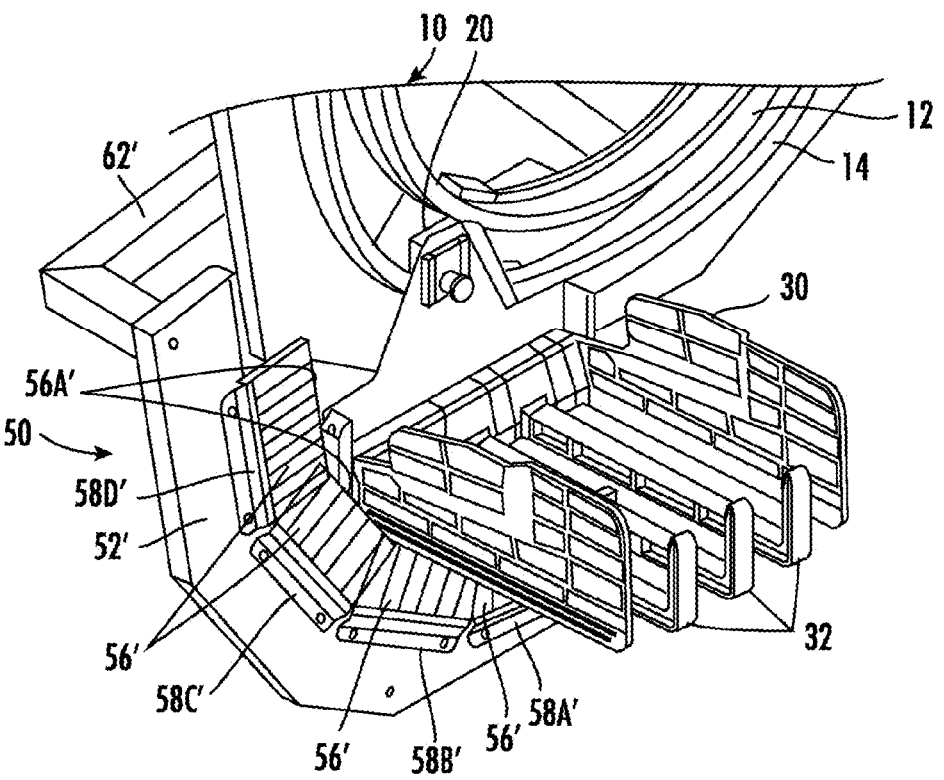
FIG. 7 is a perspective view showing the carrier basket traveling through the carrier basket stabilizing system of FIG. 4.
Figure 9:
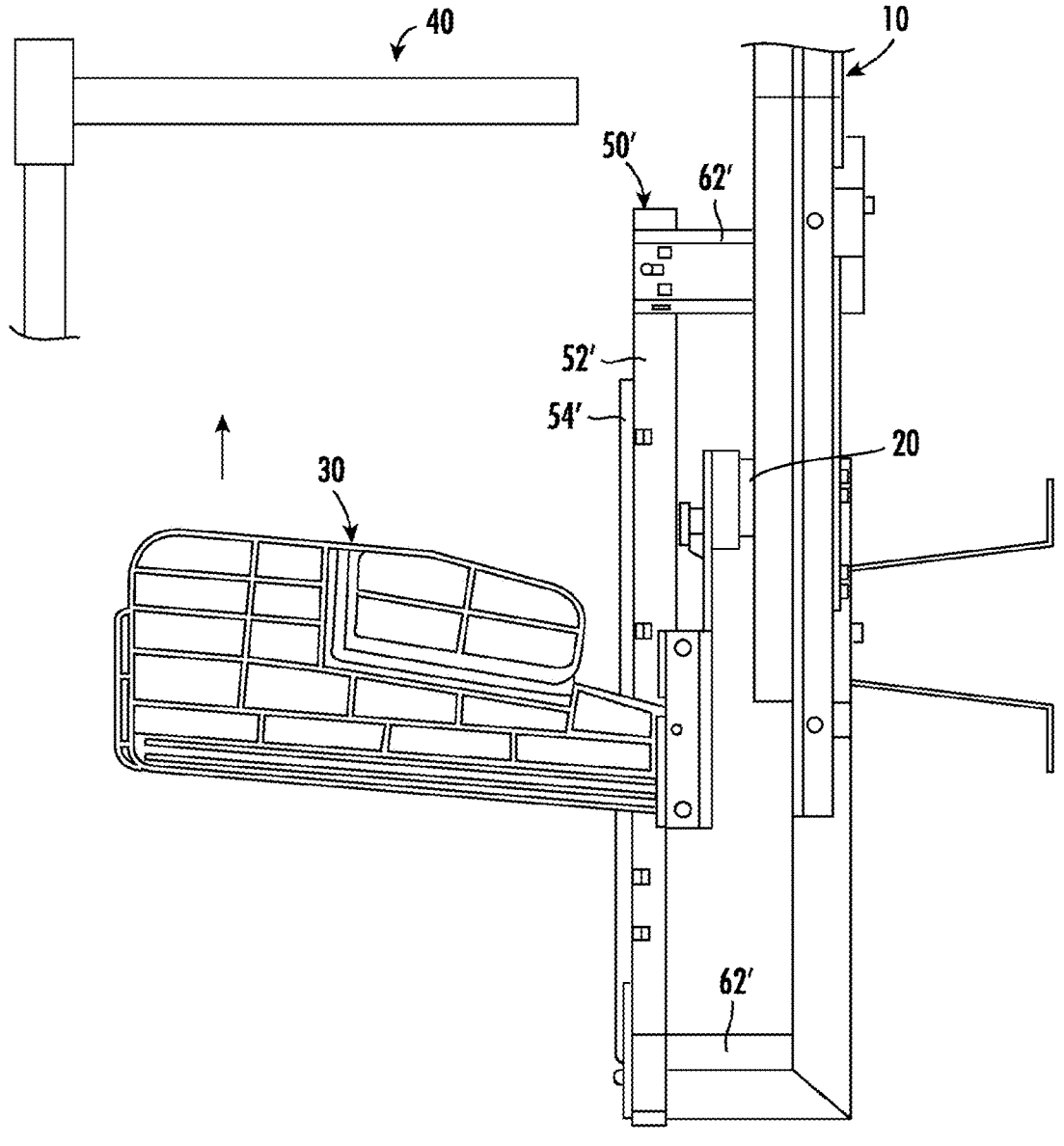
FIG. 9 is a side elevational view showing the carrier basket and the carrier basket stabilizing system, taken along lines 9-9 in FIG. 8.
Figure 10:
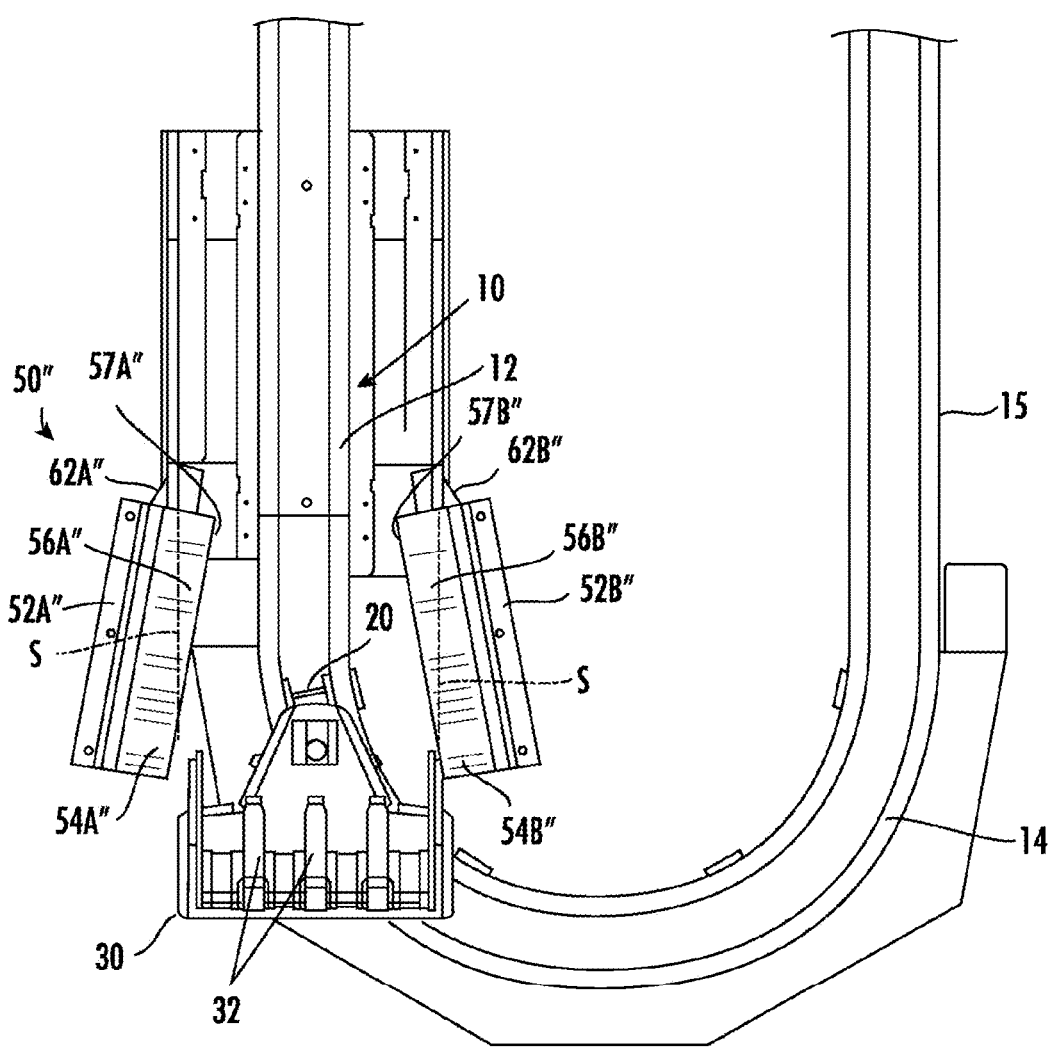
FIG. 10 is an elevational view of a third embodiment of a carrier basket stabilizing system shown with the carrier basket entering the upstream side of the deflectable elements.
Figure 11:
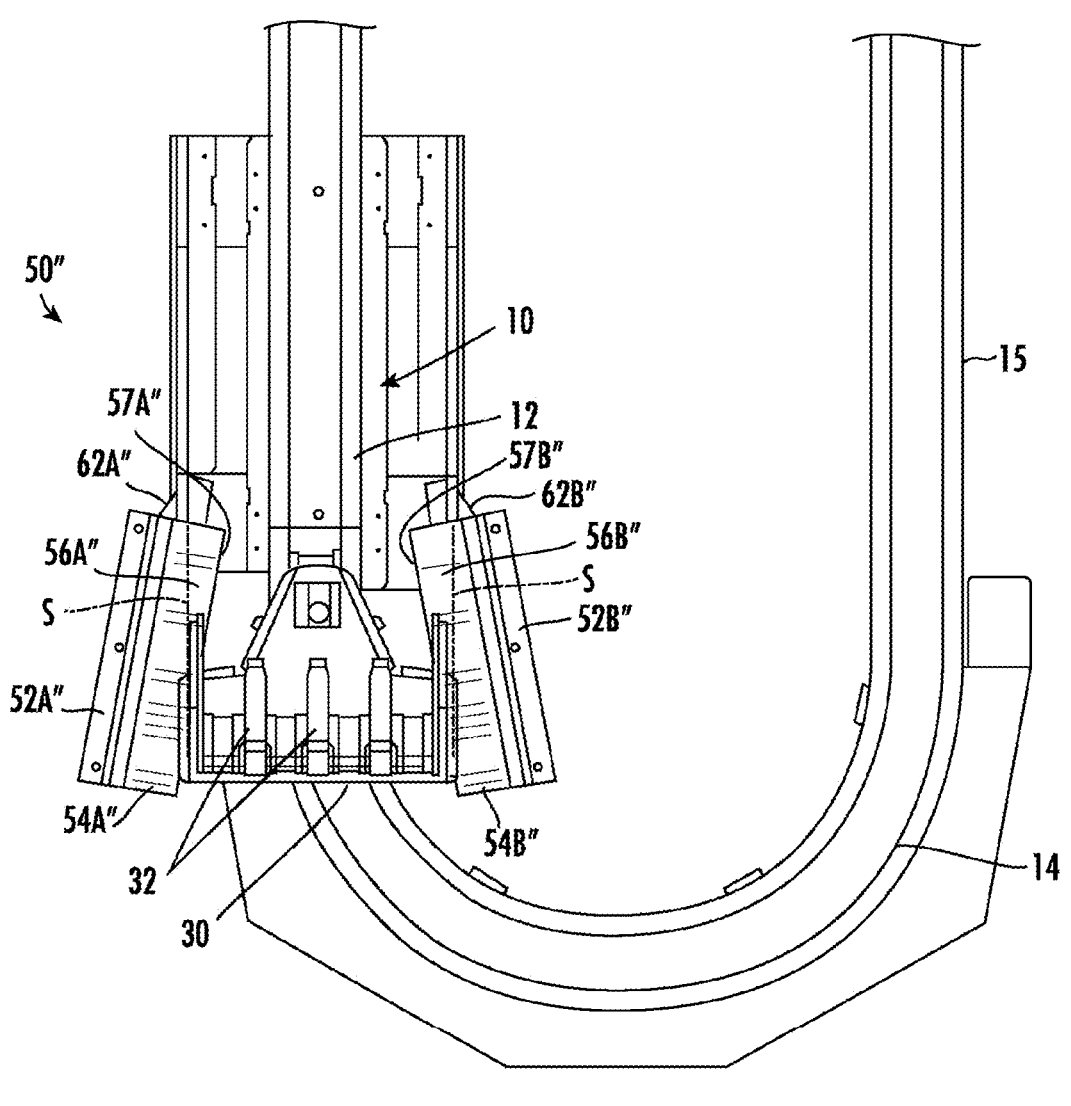
FIG. 11 is an elevational view similar to FIG. 10 showing the carrier basket in a middle portion of the carrier basket stabilizing system.
Figure 12:
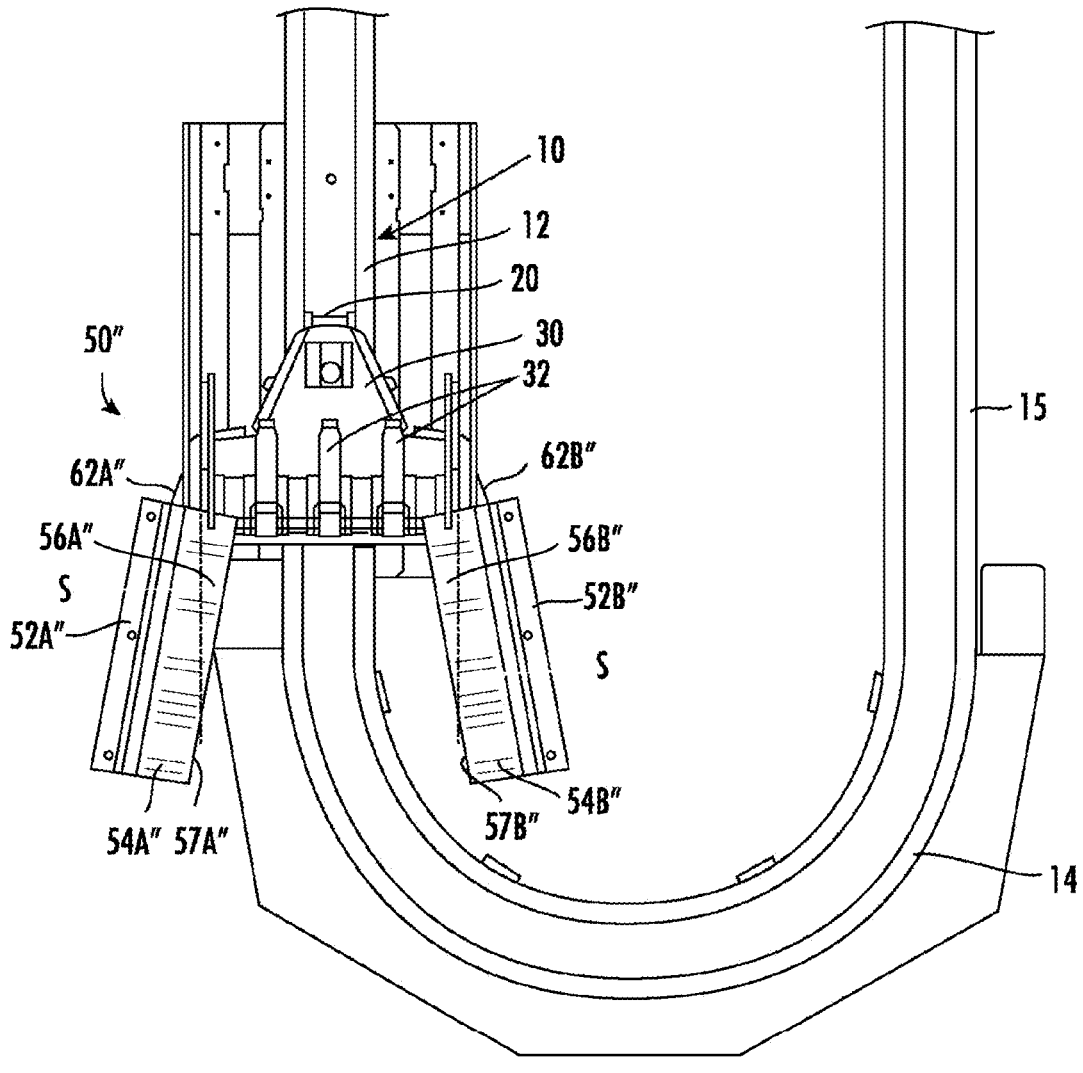
FIG. 12 is a view similar to FIGS. 10 and 11 showing the carrier basket as it exits the carrier basket stabilizing system.

Referring now to FIGS. 4-9, a second embodiment of the carrier basket stabilizing system 50' is shown. Here, the bristles 56' are arranged in a plurality of bristle segments 58A'-58D' that are attached to the support 52' to form the deflectable element 54'. Each of the bristle segments 58A'-58D' have the bristles 56' held such that the free ends 56A' of the bristles 56' are arranged linearly (see path L), and the plurality of bristle segments 58A'-58D' are arranged angled relative to one another so that the linearly arranged bristle ends 56A' extend generally parallel to the curved portion 14 of the pathway 12. The bristle ends 56A' of adjacent ones of the bristle segments 58A'-58D' may overlap slightly as shown, or may be spaced apart. While the disclosed embodiment has four of the bristle segments 58A'-58D', those skilled in the art will recognize that more or less of the bristle segments 58A'-58D' could be utilized depending upon the particular application. Additionally, while the disclosed embodiment provides that the bristle ends 56A' of the bristles 56 are arranged linearly along a straight line path L (indicated in FIG. 4 for each bristle segment 58A'-58D'), it will be recognized that these bristle segments 58A-58D could have the bristle ends 56A' arranged along a curved path to more closely approximate the curved portion 14 of the pathway 12. The deflectable element 54', defined by the bristles 56', extends partially into a space envelope S generated by at least the bottom edges of the carrier basket 30 as it moves through the curved portion 14 of the pathway 12. Finally, while the bristles 56' are shown as arranged only on one side of the pathway 12, they could be arranged on both sides to prevent both inward and outward swinging of the carrier basket 30. Depending on the particular application, the bristles 56' could be arranged only on the inside of the pathway to prevent inward swinging, As shown in FIGS. 7 and 9, mounting brackets 62' may be utilized to connect the support 52' to the conveyor system 10. Alternatively, similar to the arrangement shown in FIG. 2, the support 52' may be mounted to the ground or from another surface adjacent to the curved portion 14 of the pathway 12 defined by the conveyor system 10.

Referring now to FIGS. 10-15, a third embodiment of the carrier basket stabilizing system 50" is shown. Here, instead of one deflectable element as in the first and second embodiments, there are first and second deflectable elements 54A" and 54B", and the first and second deflectable elements 54A", 54B" are located on opposite sides of the pathway. Each of the first and second deflectable elements 54A; and 54B" are mounted on respective supports 52A", 52B". The bristles 56A", 56B" are shown as having a linear arrangement of the free ends 57A", 57B" of the bristles 56A", 56B". However, the free ends 57A", 57B" could also have a curved path to more closely approximate a space envelope S generated by at least the bottom edges of the carrier basket 30 as it moves along the pathway 12. The first and second deflectable elements 54A", 54B" are preferably arranged with respective upstream ends spaced farther apart from the pathway 12 than downstream ends thereof. While the disclosed embodiment has one deflectable elements 54A", 54B" on each side of the pathway 12, with each of the deflectable elements 54A", 54B" formed as a single bristle segment, those skilled in the art will recognize that more than one bristle segments could be utilized to form each of the first and second deflectable elements 54A", 54B", depending upon the particular application. Here, the first and second deflectable element 54A", 54B" defined by the bristles 56A", 56B", each extend partially into the space envelope S generated by at least the bottom edges of the carrier basket 30 as it moves through the curved portion 14 of the pathway 12.

Figure 13:
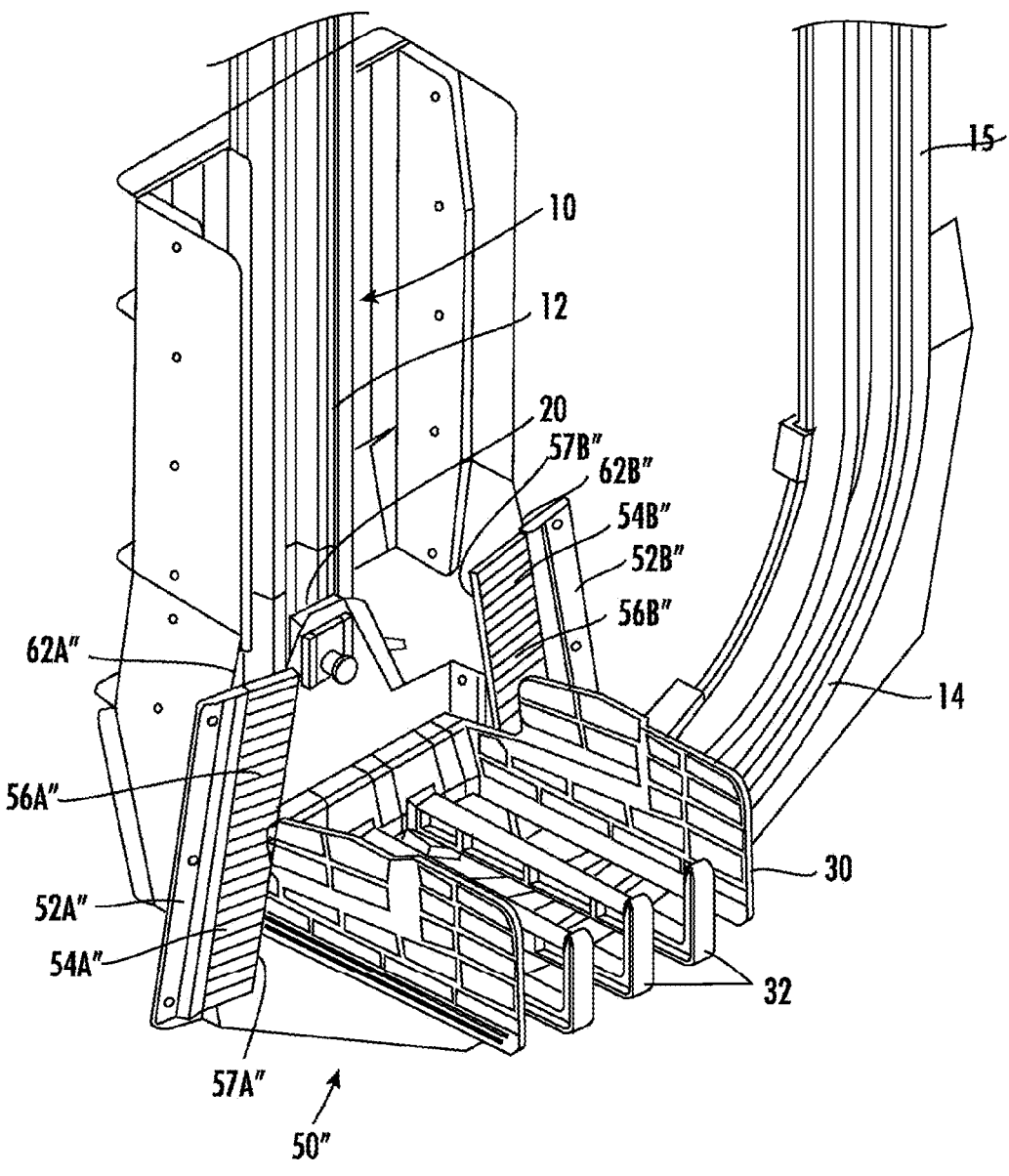
FIG. 13 is a perspective view showing the carrier basket traveling through the carrier basket stabilizing system of FIG. 10.
Figure 14:
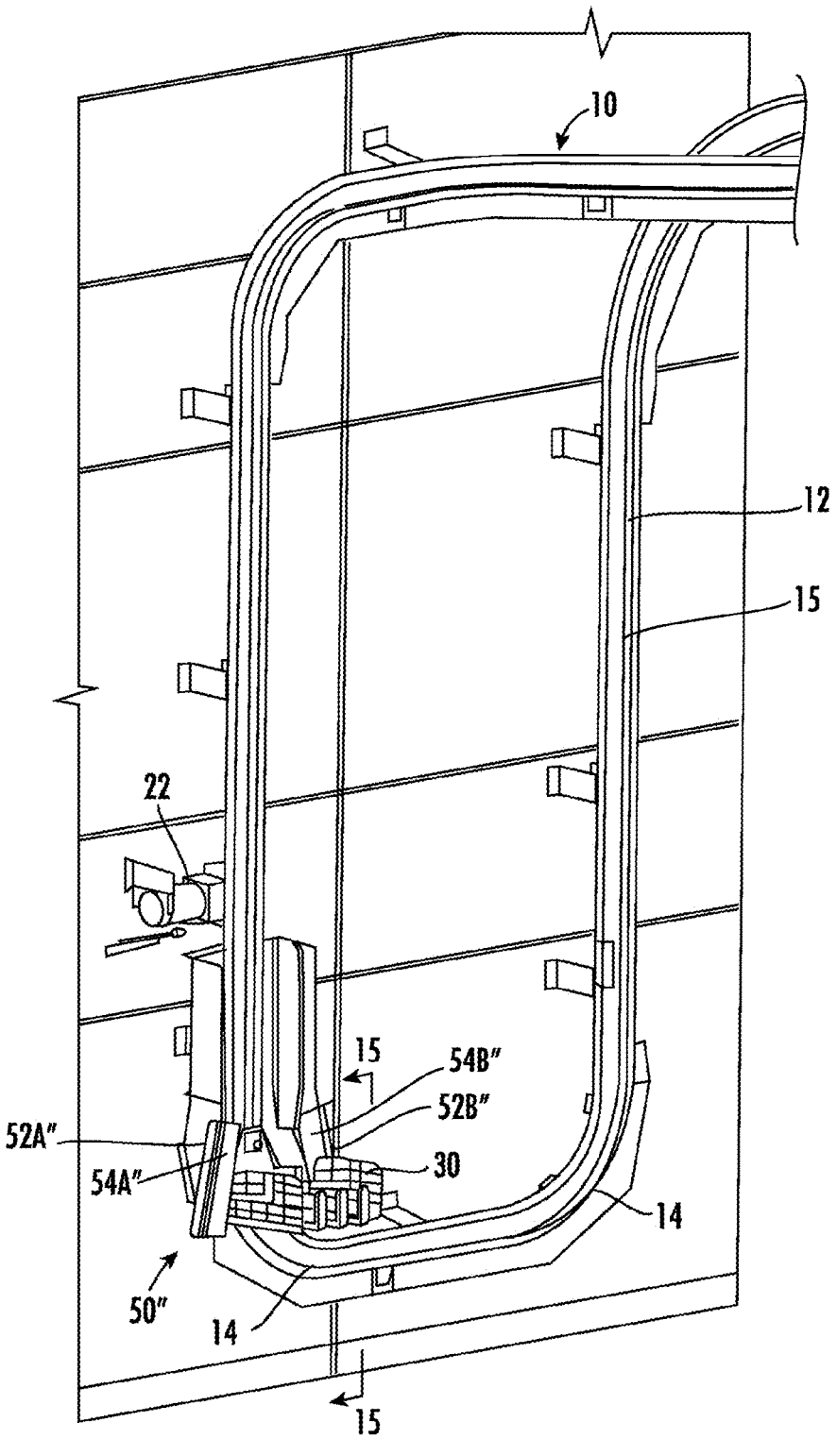
FIG. 14 is a perspective view showing a portion of the conveyor system with which the carrier basket stabilizing system of FIGS. 10-13 is utilized.
Figure 15:
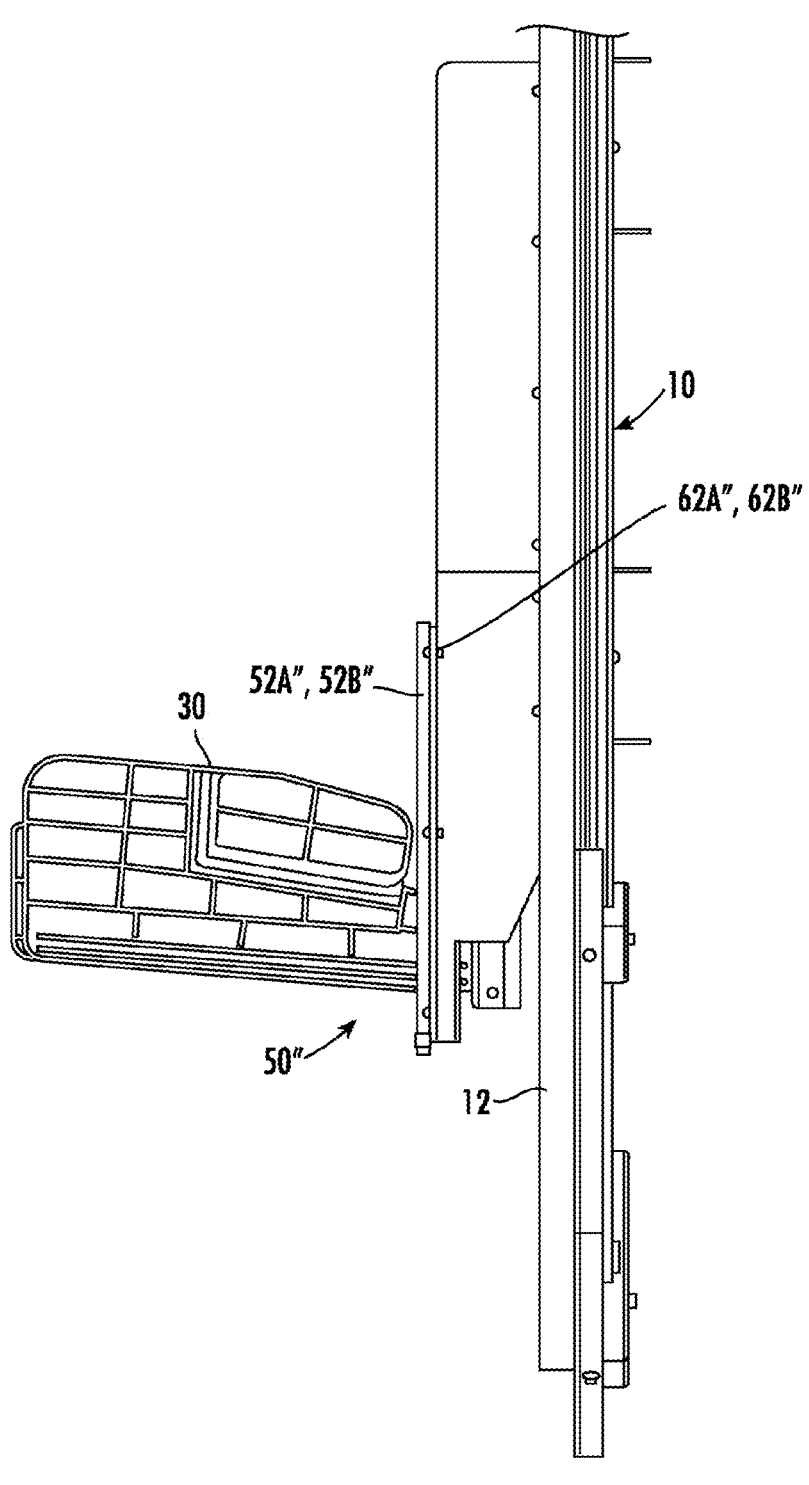
FIG. 15 is a side elevational view showing the carrier basket and the carrier basket stabilizing system, taken along lines 15-15 in FIG. 14.

As shown in FIGS. 13-15, mounting brackets 62A", 62B" may be utilized to connect the supports 52A", 52B" to the conveyor system 10. Alternatively, similar to the arrangement shown in FIG. 2, the supports 52A", 52B" may be mounted to the ground or from another surface adjacent to the pathway 12 defined by the conveyor system 10, preferably in the region coming out of the curved portion 14.

A method of stabilizing carrier baskets 30 that are moved on a conveyor system 10 that includes the pathway 12 on which the cars 20 are guided is also provided. Here, support 52, 52' is provided adjacent to the curved portion 14 of the pathway 12, and a deflectable element 54, 54' is located on the support 52, 52' such that the deflectable element 54, 54' extends generally parallel to the curved portion 14 of the pathway 12, with the deflectable element 54, 54' extending partially into a space envelope S generated by the carrier basket 30 as it moves though the curved portion 14 of the pathway 12. Here, the deflectable element 54, 54' comprises bristles 56, 56' that may be arranged along a curved path 60 as discussed above or may be provided as a plurality of bristle segments 58A'-58D'. These bristles 56, 56' suppress the outward swinging movement of the carrier basket 30 as the carrier basket 30 moves through the curved portion of the pathway 12.

Those skilled in the art will recognize that the stiffness of the bristles 56, 56' can be adjusted to suit the particular application, as can the spacing of the bristles 56, 56' from the curved portion 14 of the pathway 12. In a preferred embodiment, the bristles 56, 56' preferably extend at least about 2 inches from the support 52, 52', and the space envelope S generated by the carrier basket 30 as it moves through the curved portion 14 of the pathway 12 preferably overlaps at least 0.5 to 1.0 inches of the bristle ends 56A, 56A' when the carrier basket 30 is hanging in a neutral position.

It will be appreciated that the foregoing is presented by way of illustration only and not by way of any limitation. It is contemplated that various alternatives and modifications may be made to the described embodiments without departing from the spirit and scope of the invention. Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the ap-pended claims rather than by the foregoing description, and all alternate embodiments and changes to this embodiment which come within the meaning and range of equivalency of said claims are therefore to be embraced therein.

The invention claimed is:

1. A carrier basket stabilizing system configured for use with a conveyor system having a pathway on which cars are guided, with at least some of the cars having a carrier basket pivotally mounted thereon, the pathway including a curved portion, the carrier basket stabilizing system comprising:

a support configured to be located adjacent to the pathway;

at least one deflectable element located on the support and extending generally parallel to the pathway, the deflectable element extending partially into a space envelope generated by the carrier basket as it moves along the pathway; and the deflectable element comprises bristles that are configured to suppress at least one of an inward or an outward swinging movement of the carrier basket;

wherein the at least one deflectable element comprises first and second ones of the deflectable elements and the first and second deflectable elements are located on opposite sides of the pathway; and the first and second deflectable elements are arranged with respective upstream ends spaced farther apart from the pathway than downstream ends thereof.

2. A conveyor system including the carrier basket stabilizing system of claim 1.

3. A carrier basket stabilizing system configured for use with a conveyor system having a pathway on which cars are guided, with at least some of the cars having a carrier basket pivotally mounted thereon, the pathway including a curved portion, the carrier basket stabilizing system comprising:

a support configured to be located adjacent to the pathway;

at least one deflectable element located on the support and extending generally parallel to the pathway, the deflectable element extending partially into a space envelope generated by the carrier basket as it moves along the pathway; and

the deflectable element comprises bristles that are configured to suppress at least one of an inward or an outward swinging movement of the carrier basket;

wherein the support is a single support for the bristles and is located along the curved section of the pathway, and the deflectable element extends partially into the space envelope generated by the carrier basket as it moves along the pathway.

4. The carrier basket stabilizing system of claim 3, wherein the bristles are arranged in one or more bristle segments that are attached to the support, each of the bristle segments having the bristles held such that free ends of the bristles are arranged linearly.

5. The carrier basket stabilizing system of claim 3, wherein the bristles include bristle ends that are aligned along a curved path that is parallel to the curved portion of the pathway.

6. The carrier basket stabilizing system of claim 5, wherein the support includes a curved surface that is parallel to and offset from the curved path of the bristle ends that acts as a non-deflectable limit stop against further outward swinging movement of the carrier basket.

7. The carrier basket stabilizing system of claim 5, wherein the bristles include an angled entry area of the bristle ends on an upstream side.

8. A conveyor system including the carrier basket stabilizing system of claim 3.

9. A carrier basket stabilizing system configured for use with a conveyor system having a pathway on which cars are guided, with at least some of the cars having a carrier basket pivotally mounted thereon, the pathway including a curved portion, the carrier basket stabilizing system comprising:

a support configured to be located adjacent to the pathway;

at least one deflectable element located on the support and extending generally parallel to the pathway, the deflectable element extending partially into a space envelope generated by the carrier basket as it moves along the pathway; and the deflectable element comprises bristles that are configured to suppress at least one of an inward or an outward swinging movement of the carrier basket;

the bristles are arranged in one or more bristle segments that are attached to the support, each of the bristle segments having the bristles held such that free ends of the bristles are arranged linearly; and there are a plurality of the bristle segments that are arranged angled relative to one another so that the linearly arranged free ends extend generally parallel to the curved portion.

10. A conveyor system including the carrier basket stabilizing system of claim 9.

11. A carrier basket stabilizing system configured for use with a conveyor system having a pathway on which cars are guided, with at least some of the cars having a carrier basket pivotally mounted thereon, the pathway including a curved portion, the carrier basket stabilizing system comprising:

a support configured to be located adjacent to the pathway;

at least one deflectable element located on the support and extending generally parallel to the pathway, the deflectable element extending partially into a space envelope generated by the carrier basket as it moves along the pathway; and the deflectable element comprises bristles that are configured to suppress at least one of an inward or an outward swinging movement of the carrier basket;

wherein the conveyor system includes at least one of a loading station or an unloading station, and the curved portion of the pathway is located directly upstream of the at least one of the loading station or unloading station, and the bristles are configured to suppress at least one of the inward or the outward swinging movement of the carrier basket in order to maintain an alignment of the carrier basket as the carrier basket enters the loading station or the unloading station.

12. A conveyor system including the carrier basket stabilizing system of claim 11.

\* \* \* \* \*